United States Patent Office 2,789,135
Patented Apr. 16, 1957

2,789,135

TREATMENT OF WASTE LIQUORS FROM BEET SUGAR MOLASSES

Forest A. Hoglan, Glenview, and Morris J. Blish, Evanston, Ill., assignors to International Minerals & Chemical Corporation, a corporation of New York No Drawing. Application July 1, 1953,
Serial No. 368,846

6 Claims. (Cl. 260—527)

The instant invention relates to improved processes for the recovery of amino acids from raw materials containing them. More particularly, it relates to improved processes for the recovery of glutamic acid from waste liquors from beet sugar molasses after sugar has been partially or wholly removed.

Glutamic acid has been recovered from waste liquors from beet sugar molasses, for example, from concentrated Steffen's filtrate, by a number of processes involving acid or alkaline hydrolysis, separation of impurities from the resulting hydrolysate, and crystallization of glutamic acid, either at its isoelectric point or as glutamic acid hydrochloride. For example, U. S. Patent 2,373,342, issued to Royal, involves hydrolysis of concentrated Steffen's filtrate with lime, neutralization of the hydrolysate to a pH of about 7 with carbon dioxide to precipitate insoluble carbonates, separation of the solid material from the hydrolysate, and crystallization of glutamic acid from the hydrolysate, from which the impurities have been removed, by isoelectric crystallization at a pH of about 3.2.

Other processes, for example, U. S. Patent 2,517,601, issued to Shafor et al., describe the hydrolysis of concentrated Steffen's filtrate with caustic soda solution, neutralization of the hydrolysate, separation of inorganic impurities, and adjustment of the resulting hydrolysate to a pH of about 3.2 where glutamic acid is crystallized.

Hydrolysis of the glutamic acid mother substances present in Steffen's filtrate is generally between about 80% and about 90% complete when lime is employed as the hydrolytic agent and about 95% complete when sodium hydroxide is employed. The overall recovery of glutamic acid from Steffen's filtrate in commercial processes has been a maximum of about 65%. Investigations have been conducted to discover a hydrolyzing agent which will substantially completely hydrolyze the glutamic acid mother substance present in raw materials containing them, such as liquors from beet sugar molasses, as well as to improve processing in order to recover higher yields of glutamic acid produced by the hydrolysis.

It is an object of the instant invention to provide improved processes for the recovery of glutamic acid from waste liquors from beet sugar molasses after sugar has been partially or wholly removed.

It is a further object of the instant invention to provide an improved process for the hydrolysis of waste liquors from beet sugar molasses after sugar has been partially or wholly removed.

It is a further object of the instant invention to provide an improved hydrolyzing agent which substantially completely hydrolyzes glutamic acid mother substances present in waste liquors from beet sugar residues after sugar has been partially or wholly removed.

It is a further object of the instant invention to provide improved processes for recovering glutamic acid in comparatively high yield from beet sugar waste liquors.

These and other objects of the instant invention will become more apparent upon a fuller understanding of the instant invention as hereinafter set forth.

An improved method for the recovery of glutamic acid from waste liquors from beet sugar molasses after sugar has been partially or wholly removed involves hydrolysis of the glutamic acid mother substances present in the waste liquor with barium hydroxide, precipitation of glutamic acid from the hydrolysate in the form of the barium glutamate salt under conditions herein described, and recovery of glutamic acid from the barium glutamate salt. The barium which is employed initially as the hydrolytic agent is also utilized to precipitate the glutamic acid from the hydrolysate. The hydrolysis of the waste liquors is substantially 100% complete when barium hydroxide is employed.

Raw materials employed in practicing the instant invention are waste liquors from beet sugar molasses after partial or complete removal of sugar. Sugar is removed either by precipitation, for example as an alkaline earth metal saccharate, or by fermentation. Various of these waste liquors are known as concentrated Steffen's filtrate, vinasse, moslasses fermentation residues, schlempe, and so on.

Waste liquors from the Steffen's treatment is hydrolyzed with barium hydroxide by heating at an elevated temperature for a sufficient length of time to substantially completely hydrolyze the glutamic acid mother substances in the waste liquor. The hydrolysate is neutralized to a pH between about 6 and about 10, and the barium salt of glutamic acid is precipitated from the adjusted hydrolysate by the addition of methanol. The barium glutamate precipitate is separated, for example, by filtration or its equivalent, and glutamic acid is recovered from the barium glutamate precipitate.

In a specific embodiment of the instant invention a waste liquor from beet sugar molasses after the sugar has been partially or wholly removed, for example, concentrated Steffen's filtrate is hydrolyzed with barium hydroxide. The concentrated Steffen's filtrate is subjected to the action of barium hydroxide or of barium oxide in the presence of water which results in the formation of barium hydroxide at a sufficiently high temperature and for a sufficient length of time to effect a substantially complete hydrolysis. Generally between about 250 pounds and about 350 pounds of solid barium oxide or the equivalent thereof is added per ton of concentrated Steffen's filtrate containing between about 60% to about 65% solids. Sufficient water is added to the resulting mixture to produce a homogeneous mixture, for example generally about 250 pounds to about 500 pounds of water is sufficient per ton of concentrated Steffen's filtrate. When the mixture is heated at a temperature between about 85° C. and about 95° C., for between about two hours and about two and one-half hours the glutamic acid mother substances are substantially completely hydrolyzed. When higher or lower temperatures are employed, the length of time of hydrolysis is decreased or extended respectively in order to effect substantially complete hydrolysis. Depending upon the temperature, the hydrolysis can be carried out at atmospheric pressure or superatmospheric pressures in an autoclave or similar equipment.

After completion of the hydrolysis, the hydrolysate is neutralized to a pH between about 6 and about 10, preferably between about 7 and about 9.5 with an acid which forms a soluble barium salt, for example hydrochloric acid. Methanol is added to the resulting solution in sufficient amount to substantially completely precipitate the barium salt of glutamic acid. Generally between about 3200 pounds and about 10,000 pounds, preferably between about 3500 pounds and about 8000 pounds of methanol per ton of concentrated Steffen's filtrate is employed, or between about 2 and about 10 parts of methanol per part of concentrated Steffen's filtrate. In a preferred embodiment of the invention, about five parts by weight of methanol are used for each original part by weight of concentrated Steffen's filtrate of the solids content specified above. The barium glutamate-containing precipitate is separated from the hydrolysate, for example by filtration.

This precipitate contains about 95% or more of the glutamic acid originally and potentially present in the concentrated Steffen's filtrate and only about 25% of the organic impurities initially present in concentrated Steffen's filtrate. Glutamic acid is recovered from the barium glutamate precipitate by any convenient method, for example, by dissolving the precipitate in water, separating barium from the resulting solution in the form of an insoluble salt, and crystallizing glutamic acid from the resulting solution. Sodium carbonate, potassium carbonate, sodium bicarbonate, sulfuric acid, sulfur dioxide, carbon dioxide, or the like can be added to precipitate barium as a water insoluble salt. The insoluble barium salt is separated from the glutamic acid containing solution, for example by filtration. Carbonates are preferably employed to precipitate the barium as a water insoluble salt because barium carbonate, after separation from the solution, is easily converted to barium oxide, for example by heating to effect thermal decomposition. In the preferred embodiment of the invention in which the barium employed in the hydrolysis is also used to precipitate the glutamic acid from the hydrolysate as the barium salt, barium is then precipitated and separated as the carbonate, is thermally converted to barium oxide, and recycled to the hydrolysis step without significant loss of barium.

Glutamic acid is separated from the solution from which barium has been removed by any conventional method, for example, by isoelectric crystallization or in the form of glutamic acid hydrochloride. In a specific practice the glutamic acid containing solution is neutralized, for example, with sulfuric acid or hydrochloric acid to a pH between about 4.5 and about 7.5, preferably about 5. The adjusted solution is concentrated to between about 30% and about 50% of the original weight of the concentrated Steffen's filtrate. Solids are separated from the solution, for example by filtration. Sufficient acid, such as hydrochloric acid or sulfuric acid, is then added to the solids-free solution to produce a pH between about 2.5 and about 4.0, preferably between about 3.2 and about 3.6, and the glutamic acid, which crystallizes from the solution, is separated. About 75% of the organic impurities which are usually present in the mother liquors from which glutamic acid is crystallized have been eliminated because only about 25% of the organic impurities originally present in the concentrated Steffen's filtrate are precipitated with the barium glutamate. In conventional procedures these organic impurities prevented concentration of the mother liquor beyond a certain point because the solution becomes viscous and thick. In practicing the instant invention, the solution from which the glutamic acid is crystallized can be concentrated to a much greater extent than conventional glutamic acid mother liquors, and the yield of glutamic acid recovered is increased because the amount of glutamic acid lost in the end liquor is minimized, that is, losses range from between about 8% to about 14%. In conventional processes in which glutamic acid is recovered by isoelectric crystallization, between about 25% and about 30% of the glutamic acid originally present in the hydrolysate is lost in the end liquor and is not usually recovered due to the build up of organic impurities in the mother liquors.

The following example is presented in order to afford a clearer understanding of the practice of the instant invention, but it is to be distinctly understood that this example is illustrative only and that there is no intention to limit the invention thereto.

*Example*

About 400 grams of concentrated Steffen's filtrate (60% solids) was diluted with about 100 milliliters of water and subjected to hydrolysis by heating with about 84 grams of barium hydroxide monohydrate at a temperature between about 85° C. and about 95° C. for between about two hours and about two and one-half hours. The resulting hydrolysate was cooled and neutralized to a pH of about 9 with hydrochloric acid. Approximately 2400 milliliters of methanol was added to the partially neutralized hydrolysate, and the barium glutamic precipitate which formed was separated by filtration. The precipitate was dissolved in warm water, and about 35 grams of sodium carbonate was added to the resulting solution in order to precipitate barium carbonate. The precipitate was separated by filtration. Hydrochloric acid was added to the resulting filtrate to reduce the pH to about 5. The adjusted solution was concentrated to about 150 grams and inorganic salts, such as potassium chloride, which crystallized from the solution were separated from the solution by filtration. Glutamic acid was then recovered from the resulting solution by adjusting the pH of the solution to about 3.2 with hydrochloric acid and separating the glutamic acid which crystallized from the solution. The recovery of glutamic acid was about 83% based on the total potential glutamic acid present as its precursor in the feed material.

Having thus fully described and illustrated the character of the invention what is desired to be secured and claimed by Letters Patent is:

1. In a process for recovering glutamic acid values from a beet sugar molasses waste liquor wherein said liquor is subjected to alkaline hydrolysis and glutamic acid is crystallized and separated from the impure aqueous glutamic acid solution obtained thereby, the improvement which comprises carrying out said hydrolysis with barium hydroxide as the hydrolytic agent, adjusting the pH of the resulting hydrolyzate to between about 6 and about 10 with an acid reagent which forms a water-soluble barium salt, adding sufficient methanol to the adjusted hydrolyzate to produce a barium glutamate-containing precipitate, separating said precipitate from the hydrolyzate, dissolving said precipitate in water, and precipitating and removing barium therefrom, whereby an aqueous solution of glutamic acid of substantially improved purity is obtained.

2. The process of claim 1 wherein methanol is added to said adjusted hydrolyzate in a proportion between about 2 and about 10 parts by weight of methanol per part of said waste liquor.

3. The process of claim 2 wherein said waste liquor is concentrated Steffen's filtrate.

4. The process of claim 3 wherein methanol is added to said adjusted hydrolyzate in a proportion between about 3500 and about 8000 pounds of methanol per ton of concentrated Steffen's filtrate.

5. The process of claim 1 wherein the pH of said hydrolyzate is adjusted to between about 7 and about 9.5.

6. In a process for recovering glutamic acid values from concentrated Steffen's filtrate wherein said filtrate is subjected to alkaline hydrolysis and glutamic acid is crystallized and separated from the impure aqueous glutamic acid solution obtained thereby, the improvement which comprises carrying out said hydrolysis with barium hydroxide as the hydrolytic agent, adjusting the pH of the resulting hydrolyzate to between about 6 and about 10 with an acid reagent which forms a water-soluble barium salt, adding methanol thereto in a proportion between about 2 and about 10 parts by weight of methanol per part of adjusted hydrolyzate, whereby a barium glutamate-containing precipitate is obtained, separating said precipitate therefrom, dissolving said precipitate in water, adding to the resulting solution a reagent which precipitates barium as a water-insoluble salt, separating the insoluble barium salt from the solution, adjusting the pH of the resulting solution to between about 4.5 and about 7.5, concentrating the adjusted solution to crystallize inorganic salts therefrom, separating said crystallized salts, and adjusting the pH of the resulting solution to about 3.2 to recover glutamic acid therefrom.

References Cited in the file of this patent
UNITED STATES PATENTS

| | | |
|---|---|---|
| 1,582,472 | Ikeda | Apr. 27, 1926 |
| 2,373,342 | Royal | Apr. 10, 1945 |
| 2,525,902 | Hoglan et al | Oct. 17, 1950 |

UNITED STATES PATENT OFFICE

CERTIFICATE OF CORRECTION

Patent No. 2,789,135            April 16, 1957

Forest A. Hoglan et al.

It is hereby certified that error appears in the printed specification of the above numbered patent requiring correction and that the said Letters Patent should read as corrected below.

Column 2, line 23, for "moslasses" read -- molasses --; column 4, line 17, for "glutamic" read -- glutamate --; line 68, for "aqueuos" read -- aqueous --.

Signed and sealed this 4th day of June 1957.

(SEAL)
Attest:

KARL H. AXLINE
Attesting Officer

ROBERT C. WATSON
Commissioner of Patents per part of adjusted hydrolyzate, whereby a barium glutamate-containing precipitate is obtained, separating said precipitate therefrom, dissolving said precipitate in water, adding to the resulting solution a reagent which precipitates barium as a water-insoluble salt, separating the insoluble barium salt from the solution, adjusting the pH of the resulting solution to between about 4.5 and about 7.5, concentrating the adjusted solution to crystallize inorganic salts therefrom, separating said crystallized salts, and adjusting the pH of the resulting solution to about 3.2 to recover glutamic acid therefrom.

References Cited in the file of this patent
UNITED STATES PATENTS

| 1,582,472 | Ikeda | Apr. 27, 1926 |
| 2,373,342 | Royal | Apr. 10, 1945 |
| 2,525,902 | Hoglan et al | Oct. 17, 1950 |

UNITED STATES PATENT OFFICE
CERTIFICATE OF CORRECTION

Patent No. 2,789,135            April 16, 1957

Forest A. Hoglan et al.

It is hereby certified that error appears in the printed specification of the above numbered patent requiring correction and that the said Letters Patent should read as corrected below.

Column 2, line 23, for "moslasses" read -- molasses --; column 4, line 17, for "glutamic" read -- glutamate --; line 68, for "aqueuos" read -- aqueous --.

Signed and sealed this 4th day of June 1957.

(SEAL)
Attest:

KARL H. AXLINE
Attesting Officer

ROBERT C. WATSON
Commissioner of Patents

UNITED STATES PATENT OFFICE
CERTIFICATE OF CORRECTION

Patent No. 2,789,135                          April 16, 1957

Forest A. Hoglan et al.

It is hereby certified that error appears in the printed specification of the above numbered patent requiring correction and that the said Letters Patent should read as corrected below.

Column 2, line 23, for "moslasses" read -- molasses --; column 4, line 17, for "glutamic" read -- glutamate --; line 68, for "aqueuos" read -- aqueous --.

Signed and sealed this 4th day of June 1957.

(SEAL)
Attest:

KARL H. AXLINE
Attesting Officer

ROBERT C. WATSON
Commissioner of Patents